(12) United States Patent
Wen et al.

(10) Patent No.: US 7,825,777 B1
(45) Date of Patent: Nov. 2, 2010

(54) PACKET PROCESSORS HAVING COMPARATORS THEREIN THAT DETERMINE NON-STRICT INEQUALITIES BETWEEN APPLIED OPERANDS

(75) Inventors: Tingjun Wen, Kanata (CA); David Walter Carr, Nepean (CA); Tadeusz Kwasniewski, Ottawa (CA)

(73) Assignee: Integrated Device Technology, Inc., San Jose, CA (US)

( * ) Notice: Subject to any disclaimer, the term of this patent is extended or adjusted under 35 U.S.C. 154(b) by 1252 days.

(21) Appl. No.: 11/393,489

(22) Filed: Mar. 30, 2006

Related U.S. Application Data

(60) Provisional application No. 60/780,481, filed on Mar. 8, 2006.

(51) Int. Cl.
*G05B 1/00* (2006.01)
*H03K 19/20* (2006.01)
*H03K 19/094* (2006.01)
*G06F 7/00* (2006.01)

(52) U.S. Cl. .................... 340/146.2; 326/104; 326/112; 326/119; 708/200

(58) Field of Classification Search ............. 340/146.2; 365/49.1, 49.16–49.17; 326/113; 708/671
See application file for complete search history.

(56) References Cited

U.S. PATENT DOCUMENTS

| | | | |
|---|---|---|---|
| 3,938,087 A * | 2/1976 | Louie ...................... | 340/146.2 |
| 4,450,432 A * | 5/1984 | Schmidtpott et al. ..... | 340/146.2 |
| 4,728,927 A * | 3/1988 | Aman ...................... | 340/146.2 |
| 4,755,696 A * | 7/1988 | Pickett ...................... | 326/113 |
| 4,845,668 A | 7/1989 | Sano et al. | |
| 5,059,942 A | 10/1991 | Burrows | |
| 5,260,680 A | 11/1993 | Glass | |
| 5,345,411 A | 9/1994 | Yoneda | |
| 5,592,142 A * | 1/1997 | Adams et al. ............ | 340/146.2 |
| 5,699,288 A | 12/1997 | Kim et al. | |
| 5,742,224 A * | 4/1998 | Gaducci et al. ......... | 340/146.2 |
| 5,859,791 A | 1/1999 | Schultz et al. | |
| 6,044,005 A | 3/2000 | Gibson et al. | |

(Continued)

OTHER PUBLICATIONS

Max Fishman, D. Horelick, "Inequality Comparator", SLAC-PUB-0546, Jan. 1969, Published in Electron.Design 17:92-93,1969, issue No. 13, retrieved from http://www.slac.stanford.edu/cgi-wrap/getdoc/slac-pub-0546.pdf.*

(Continued)

*Primary Examiner*—Chat C Do
*Assistant Examiner*—Matthew Sandifer
(74) *Attorney, Agent, or Firm*—Myers, Bigel, et al.

(57) ABSTRACT

An integrated circuit comparator is provided that determines non-strict inequalities between operands applied thereto. Each comparator includes at least one n-bit comparator cell. This comparator cell is configured to determine a non-strict inequality between a first n-bit operand (e.g., A[n–1, . . . , 0]) and a second n-bit operand (e.g., B[n–1, . . . , 0]). The comparator cell determines the non-strict inequality by computing a control output signal $C_o$ (or its complement), where:

$$C_o = (\ldots((C_i(A_0 + \overline{B_0}) + A_0\overline{B_0})(A_1 + \overline{B_1}) + A_1\overline{B_1})\ldots(A_{n-2} + \overline{B_{n-2}}) + A_{n-2}\overline{B_{n-2}})$$
$$(A_{n-1} + \overline{B_{n-1}}) + A_{n-1}\overline{B_{n-1}},$$

"n" is a positive integer greater than one and $C_i$ is a control input signal that specifies an interpretation to be given to the control output signal $C_o$.

10 Claims, 9 Drawing Sheets

U.S. PATENT DOCUMENTS

| | | |
|---|---|---|
| 6,078,987 A | 6/2000 | Kongetira |
| 6,166,938 A | 12/2000 | Wong |
| 6,195,278 B1 | 2/2001 | Calin et al. |
| 6,240,004 B1 | 5/2001 | Kuo et al. |
| 6,256,216 B1 | 7/2001 | Lien et al. |
| 6,349,049 B1 | 2/2002 | Schoy |
| 6,353,646 B1 | 3/2002 | Rossignol |
| 6,385,070 B1 | 5/2002 | Peterson |
| 6,496,398 B2 | 12/2002 | Hellner et al. |
| 6,618,280 B2 | 9/2003 | Takahashi et al. |
| 6,631,086 B1 | 10/2003 | Bill et al. |
| 6,633,953 B2 | 10/2003 | Stark |
| 6,665,214 B1 | 12/2003 | Cheah et al. |
| 6,707,718 B1 | 3/2004 | Halim et al. |
| 6,742,105 B1 | 5/2004 | Ott |
| 6,760,249 B2 | 7/2004 | Chien |
| 6,766,317 B2 | 7/2004 | Sharma et al. |
| 6,842,817 B2 | 1/2005 | Avery |
| 6,859,455 B1 | 2/2005 | Yazdani et al. |
| 6,901,476 B2 | 5/2005 | Stark et al. |
| 6,906,936 B1 | 6/2005 | James et al. |
| 6,947,302 B2 | 9/2005 | Regev |
| 6,957,215 B2 | 10/2005 | Stark |
| 7,080,365 B2 | 7/2006 | Broughton et al. |
| 7,298,636 B1 | 11/2007 | Wen et al. |
| 2002/0036912 A1 | 3/2002 | Helwig |
| 2002/0141218 A1 | 10/2002 | Foss et al. |
| 2002/0152209 A1 | 10/2002 | Merugu et al. |
| 2003/0012063 A1 | 1/2003 | Chien |
| 2003/0035331 A1 | 2/2003 | Foss et al. |
| 2003/0097605 A1 | 5/2003 | Sharma et al. |
| 2003/0108043 A1 | 6/2003 | Liao |
| 2003/0123459 A1 | 7/2003 | Liao |
| 2003/0188299 A1 | 10/2003 | Broughton et al. |
| 2004/0133590 A1 | 7/2004 | Henderson et al. |
| 2004/0139274 A1 | 7/2004 | Hui |
| 2004/0213275 A1 | 10/2004 | Basso et al. |
| 2004/0225782 A1 | 11/2004 | Avery |
| 2005/0144413 A1 | 6/2005 | Kuo et al. |
| 2005/0213360 A1 | 9/2005 | Park |
| 2006/0002386 A1 | 1/2006 | Yik et al. |

OTHER PUBLICATIONS

Jan M. Rabaey, Anantha P. Chandrakasan, and Borivoje Nikolic, "Chapter 4 (1): Combinational Logic in CMOS", slide-set for "Digital Integrated Circuits: a design perspective", Prentice Hall electronics and VLSI series, Pearson Education, 2 edition, Jan. 2003, retrieved from http://bwrc.eecs.berkeley.edu/classes/IcBook/instructors.html.*

Rabaey, J. M.; Chandrakasan, A. & Nikolic, B.; Digital Integrated Circuits: A Design Perspective, Second Edition; Prentice Hall, 2004, pp. 235-236, 263-264, 284-285.*

Spitznagel et al., "Packet Classification Using Extended TCAMs," Proceedings of the 11$^{th}$ IEEE International Conference on Network Protocols, 2003, 12 pages.

"All Elementary Mathematics—Study Guide—Algebra—Inequalities: common information," http://www.bymath.com/studyguide/alg/sec/alg27.html, 1 page 2006.

Spitznagel, Edward W., "CMOS Implementation of a Range Check Circuit," Washington University in St. Louis, School of Engineering & Applied Science, Department of Computer Science & Engineering, WUCSE-2004-39, Jul. 6, 2004, 11 pages.

Kim et al., "A Storage- and Power-Efficient Range-Matching TCAM for Packet Classification," 2006 IEEE International Solid-State Circuits Conference, Feb. 7, 2006, pp. 168-169, 646.

Pagiamtzis et al., "Content-Addressable Memory (CAM) Circuits and Architectures: A Tutorial and Survey," IEEE Journal of Solid-State Circuits, vol. 41, No. 3, Mar. 2006, pp. 712-727.

* cited by examiner

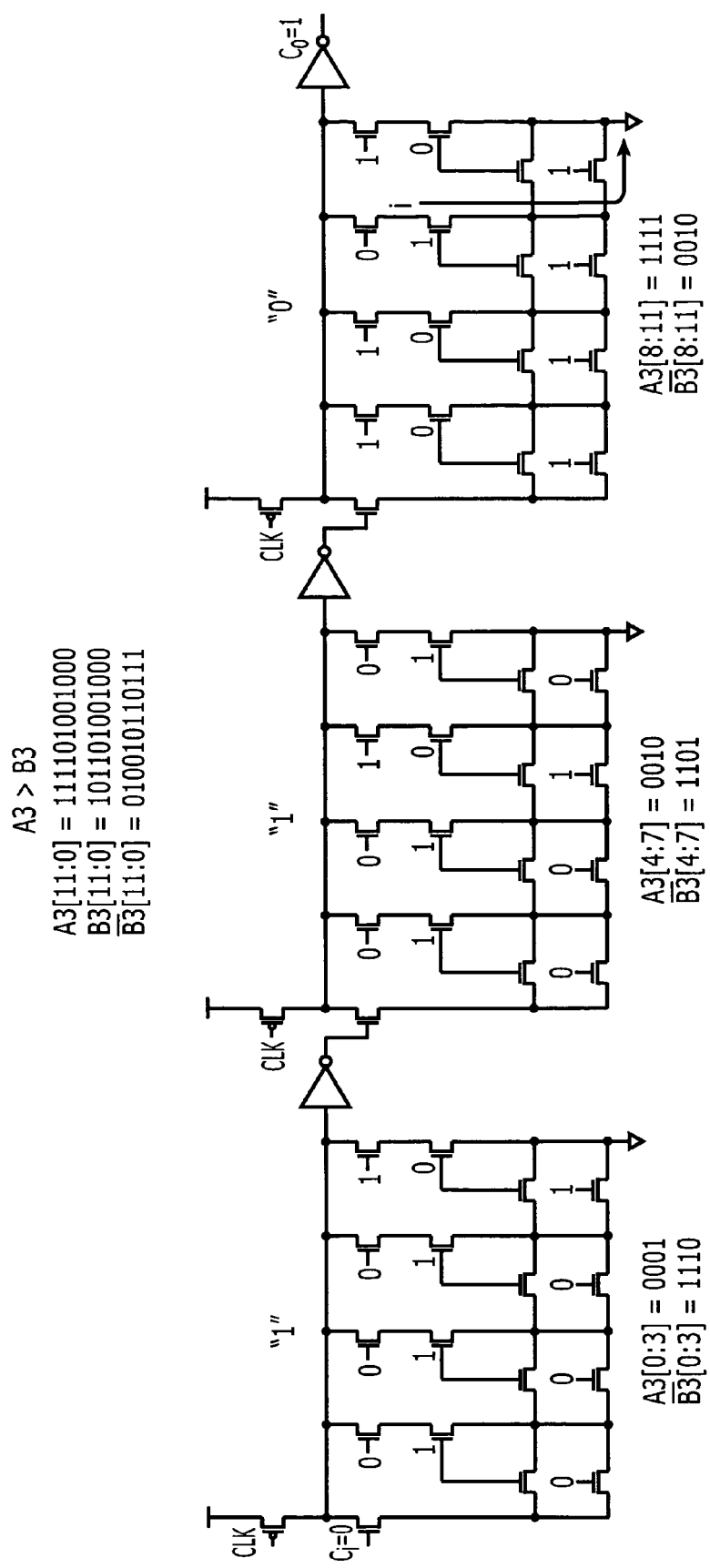

PACKET PROCESSORS HAVING COMPARATORS THEREIN THAT DETERMINE NON-STRICT INEQUALITIES BETWEEN APPLIED OPERANDS

REFERENCE TO PRIORITY APPLICATION

This application claims priority to U.S. Provisional Application Ser. No. 60/780,481, filed Mar. 8, 2006, the disclosure of which is hereby incorporated herein by reference.

CROSS-REFERENCE TO RELATED APPLICATION

This application is related to U.S. application Ser. No. 11/393,284, entitled: "Packet Processors Having Multi-Functional Range Match Cells Therein," now U.S. Pat. No. 7,298,636, the disclosure of which is hereby incorporated herein by reference.

FIELD OF THE INVENTION

The present invention relates to integrated circuit devices and, more particularly, to integrated circuit comparators.

BACKGROUND OF THE INVENTION

Packet classification operations are frequently performed in high performance routers to determine how packets received at an input of a router are classified. This classification typically determines both an output port to which a packet should be sent and also determines what, if any, special handling the packet should receive. Typical packet classification operations utilize packet filters. Such filters may specify values of source and destination address fields of an IP header, a protocol field and source and destination port numbers, for example. Conventional packet classification operations have frequently utilized only a limited number of packet filters, which makes it possible to match every incoming packet against a predefined and ordered sequence of filters. Unfortunately, these conventional packet classification operations typically do not scale efficiently to systems having high packet processing rates and/or large packet filtering requirements.

Ternary content addressable memories (TCAMs) support packet processing operations by enabling comparisons to be performed in parallel between an applied search key (e.g., packet or field within a packet) and a plurality of stored data patterns (i.e., CAM entries), which are typically configured as a plurality of value and bit mask pairs within a corresponding plurality of TCAM cells. However, the typical drawbacks of TCAMs are relatively high power consumption and relatively inefficient representation of filters containing ranges to be matched. Such filters are typically handled by using multiple TCAM entries for each stored data pattern having at least one field therein that specifies a range to be matched. But, representing each data pattern using multiple TCAM entries can reduce the effective capacity of a TCAM by a factor of two or typically much greater than two in most applications. These shortcomings associated with TCAMs are more fully described in an article by Ed Spitznagel et al., entitled "Packet Classification Using Extended TCAMs," Proceedings of the 11th IEEE International Conference on Network Protocols (2003). As described in this article, one way to better handle filters when performing packet processing is to expand TCAM functionality to directly incorporate range check circuits within a TCAM core. These range check circuits are also described in a technical report by Ed Spitznagel, entitled "CMOS Implementation of a Range Check Circuit," Washington University, Report No. WUCSE-2004-39 (2004). In particular, this report describes storing lower and upper bounds for each range to be matched and using dedicated range check circuitry, which performs a comparison using a set of stages. Techniques for performing range matching are also disclosed in U.S. Pat. No. 6,742,105 to Ott, entitled "Method and System for Range Matching;" and U.S. Pat. No. 6,766,317 to Sharma et al., entitled "Range Check Cell and a Method for The Use Thereof."

SUMMARY OF THE INVENTION

Packet processors and other integrated circuit devices according to embodiments of the present invention include comparators that determine non-strict inequalities between operands applied thereto. These integrated circuit comparators can be used to efficiently perform range match operations within packet processors and other types of search engine and classification devices. Each comparator includes at least one n-bit comparator cell. This comparator cell is configured to determine a non-strict inequality between a first n-bit operand (e.g., A[n−1, . . . , 0]) and a second n-bit operand (e.g., B[n−1, . . . , 0]). The comparator cell determines the non-strict inequality by computing a control output signal $C_o$ (or its complement), where:

$$C_o = (...((C_i(A_0 + \overline{B_0}) + A_0\overline{B_0})(A_1 + \overline{B_1}) + A_1\overline{B_1})...(A_{n-2} + \overline{B_{n-2}}) + A_{n-2}\overline{B_{n-2}})$$
$$(A_{n-1} + \overline{B_{n-1}}) + A_{n-1}\overline{B_{n-1}},$$

"n" is a positive integer greater than one and $C_i$ is a control input signal that specifies an interpretation to be given to the control output signal $C_o$.

Some embodiments of the n-bit comparator cell can include first, second, third and fourth pairs of MOS transistors. The first pair of MOS transistors, which are electrically connected in parallel between first and second nodes, have gate terminals that receive operand bit A0 and a complement of operand bit B0. The second pair of MOS transistors, which are electrically connected in parallel between the second node and a third node, have gate terminals that receive operand bit A1 and a complement of operand bit B1. The third pair of MOS transistors, which are electrically connected in series between the first (or second) node and a fourth node (e.g., primary node), have gate terminals that receive the operand bit A0 and the complement of operand bit B0. The fourth pair of MOS transistors, which are electrically connected in series between the second (or third) node and the fourth node, have gate terminals that receive the operand bit A1 and the complement of operand bit B1.

According to still further embodiments of the invention, the comparator cell is configured so that each one bit increase in "n" results in a four transistor increase in cell size for "n" in at least the following range of n: 2<n<6, and possibly a much greater range depending on cell configuration, power supply voltage and transistor threshold voltage, for example. The comparator cell may also be configured so that the n-bit comparator cell is an M-transistor cell, where M is a positive integer in a range from 4n+2 to 4n+6. According to further aspects of this comparator cell, a MOS input transistor is provided. This MOS input transistor has a first current carrying terminal electrically connected to the first node, a second current carrying terminal electrically connected to the fourth node and a gate terminal that receives the control input signal $C_i$.

According to still further embodiments of the present invention, a comparator cell is provided that is responsive to a control input signal ($C_i$) and first and second multi-bit operands. The comparator cell is configured to generate a control output signal ($C_o$) that encodes a "≦" inequality between the first and second multi-bit operands when the control input signal is in a first logic state and encodes a "≧" inequality between the first and second multi-bit operands when the control input signal is in a second logic state.

The comparator cell may be further configured so that the control output signal determines a "≦" or ">" inequality between the first and second multi-bit operands when the control input signal is in the first logic state. This control output signal may also determine a "≧" or "<" inequality between the first and second multi-bit operands when the control input signal is in the second logic state.

BRIEF DESCRIPTION OF THE DRAWINGS

FIG. 2C is an electrical schematic showing 3-stages of a 4-bit comparator cell according to embodiments of the present invention.

DETAILED DESCRIPTION OF PREFERRED EMBODIMENTS

Figure 1A:
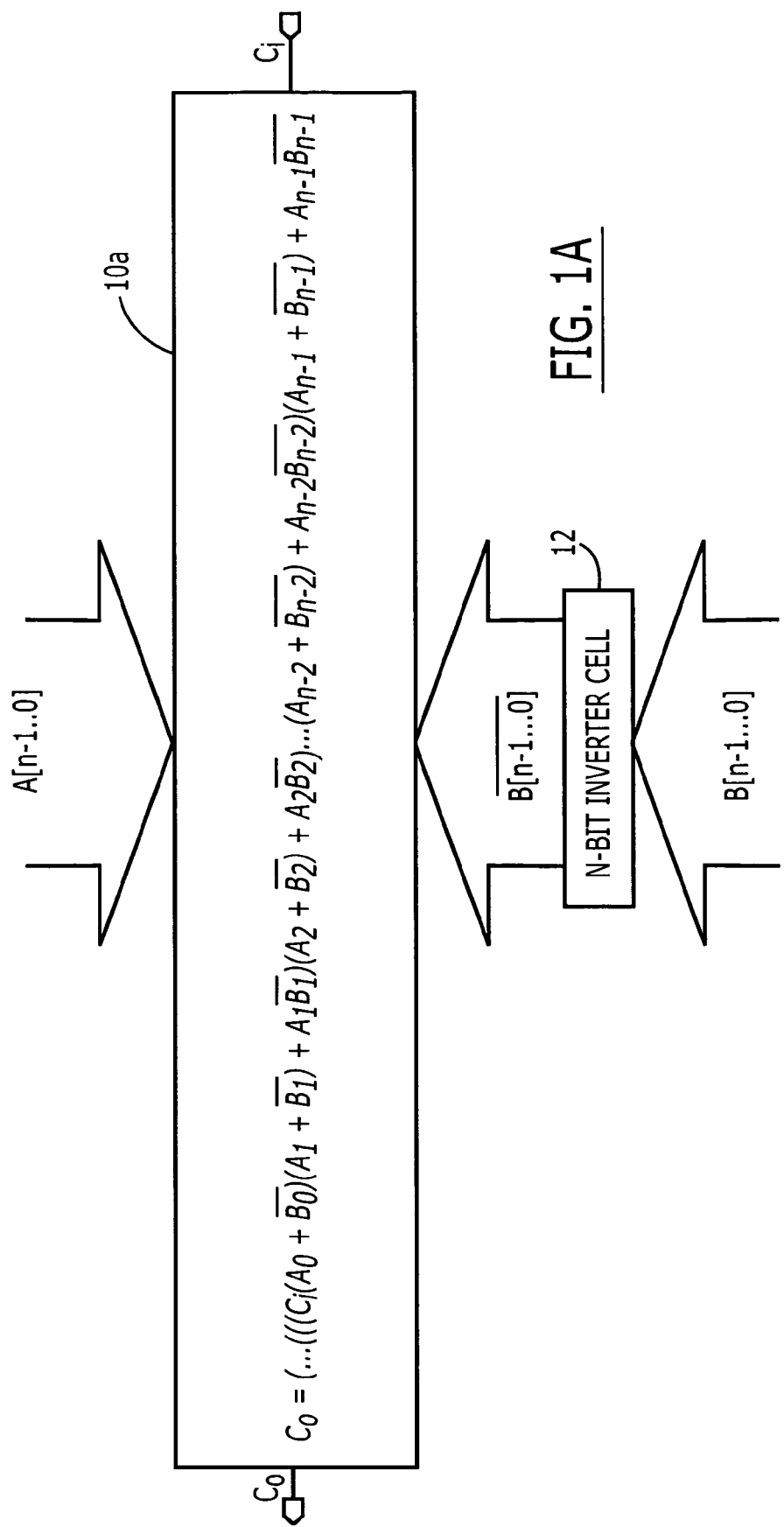
FIG. 1A is a block diagram illustrating non-strict equivalency operations performed by a comparator according to embodiments of the present invention.

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals. The suffix B (or prefix symbol "/") to a signal name may also denote a complementary data or information signal or an active low control signal, for example.

Referring now to FIGS. 1A-1D, an integrated circuit comparator 10a according to embodiments of the invention is configured to determine a non-strict inequality between a pair of n-bit operands applied thereto. These two operands are illustrated in FIG. 1A as a first n-bit operand (e.g., A[n−1, . . . , 0]) and a second n-bit operand (e.g., B[n−1, . . . , 0]). A bitwise negated version of the second n-bit operand is generated by an n-bit inverter cell 12 and provided directly to the comparator 10a. The n-bit comparator 10a generates a single control output signal $C_o$ in response to a single control input signal $C_i$ that specifies how the control output signal $C_o$ should be interpreted. In particular, when the control input signal $C_i$=0, then the control output signal $C_o$ will equal 0 if A≦B or $C_o$ will equal 1 if A>B. Alternatively, when the control input signal $C_i$=1, then the control output signal $C_o$ will equal 0 if A<B or $C_o$ will equal 1 if A≦B. These values of the control output signal $C_o$ are determined by the following expression (1) (or its boolean or complementary equivalents):

$$C_o = (...((C_i(A_0 + \overline{B_0}) + A_0\overline{B_0})(A_1 + \overline{B_1}) + A_1\overline{B_1})...(A_{n-2} + \overline{B_{n-2}}) +$$
$$A_{n-2}\overline{B_{n-2}})(A_{n-1} + \overline{B_{n-1}}) + A_{n-1}\overline{B_{n-1}}.$$

For the case of a 1-bit comparator 10a, expression (1) simplifies to the following expression (2):

$$C_o = C_i(A_o + \overline{B_o}) + A_o\overline{B_o} \qquad (2)$$

The truth table (TABLE 1) for expression (2) is provided as:

TABLE 1

| $C_i$ | A | B | $C_o$ | INTERPRETATION |
|---|---|---|---|---|
| 0 | 0 | 0 | 0 | <= |
| 0 | 0 | 1 | 0 | <= |
| 0 | 1 | 0 | 1 | > |
| 0 | 1 | 1 | 0 | <= |
| 1 | 0 | 0 | 1 | >= |
| 1 | 0 | 1 | 0 | < |
| 1 | 1 | 0 | 1 | >= |
| 1 | 1 | 1 | 1 | >= |

As illustrated by TABLE 1, the value of the control output signal $C_o$ is a function of the value of the control input signal $C_i$. When the control input signal $C_i$ is set to a logic 0 value (as shown in the top half of TABLE 1), then the value of the control output signal $C_o$ signifies either a non-strict inequality that operand A is less than or equal to operand B or a strict inequality that operand A is greater than operand B. Alternatively, when the control input signal $C_i$ is set to a logic 1 value (as shown in the bottom half of TABLE 1), then the value of the control output signal $C_o$ signifies either a non-strict inequality that operand A is greater than or equal to operand B or a strict inequality that operand A is less than operand B.

For the case of a 2-bit comparator 10a, expression (1) simplifies to the following expression (3):

$$C_o = (C_i(A_0 + \overline{B_0}) + A_0\overline{B_0})(A_1 + \overline{B_1}) + A_1\overline{B_1}. \qquad (3)$$

The truth table (TABLE 2) for expression (3) is provided as:

TABLE 2

| $C_i$ | A | B | $C_o$ | INTERPRETATION |
|---|---|---|---|---|
| 0 | 00 | 00 | 0 | <= |
| 0 | 00 | 01 | 0 | <= |
| 0 | 00 | 10 | 0 | <= |
| 0 | 00 | 11 | 0 | <= |
| 0 | 01 | 00 | 1 | > |
| 0 | 01 | 01 | 0 | <= |
| 0 | 01 | 10 | 0 | <= |
| 0 | 01 | 11 | 0 | <= |
| 0 | 10 | 00 | 1 | > |
| 0 | 10 | 01 | 1 | > |
| 0 | 10 | 10 | 0 | <= |
| 0 | 10 | 11 | 0 | <= |
| 0 | 11 | 00 | 1 | > |
| 0 | 11 | 01 | 1 | > |
| 0 | 11 | 10 | 1 | > |
| 0 | 11 | 11 | 0 | <= |
| 1 | 00 | 00 | 1 | >= |
| 1 | 00 | 01 | 0 | < |
| 1 | 00 | 10 | 0 | < |
| 1 | 00 | 11 | 0 | < |
| 1 | 01 | 00 | 1 | >= |
| 1 | 01 | 01 | 1 | >= |
| 1 | 01 | 10 | 0 | < |
| 1 | 01 | 11 | 0 | < |
| 1 | 10 | 00 | 1 | >= |
| 1 | 10 | 01 | 1 | >= |
| 1 | 10 | 10 | 1 | >= |
| 1 | 10 | 11 | 0 | < |
| 1 | 11 | 00 | 1 | >= |
| 1 | 11 | 01 | 1 | >= |
| 1 | 11 | 10 | 1 | >= |
| 1 | 11 | 11 | 1 | >= |

Figure 1B:
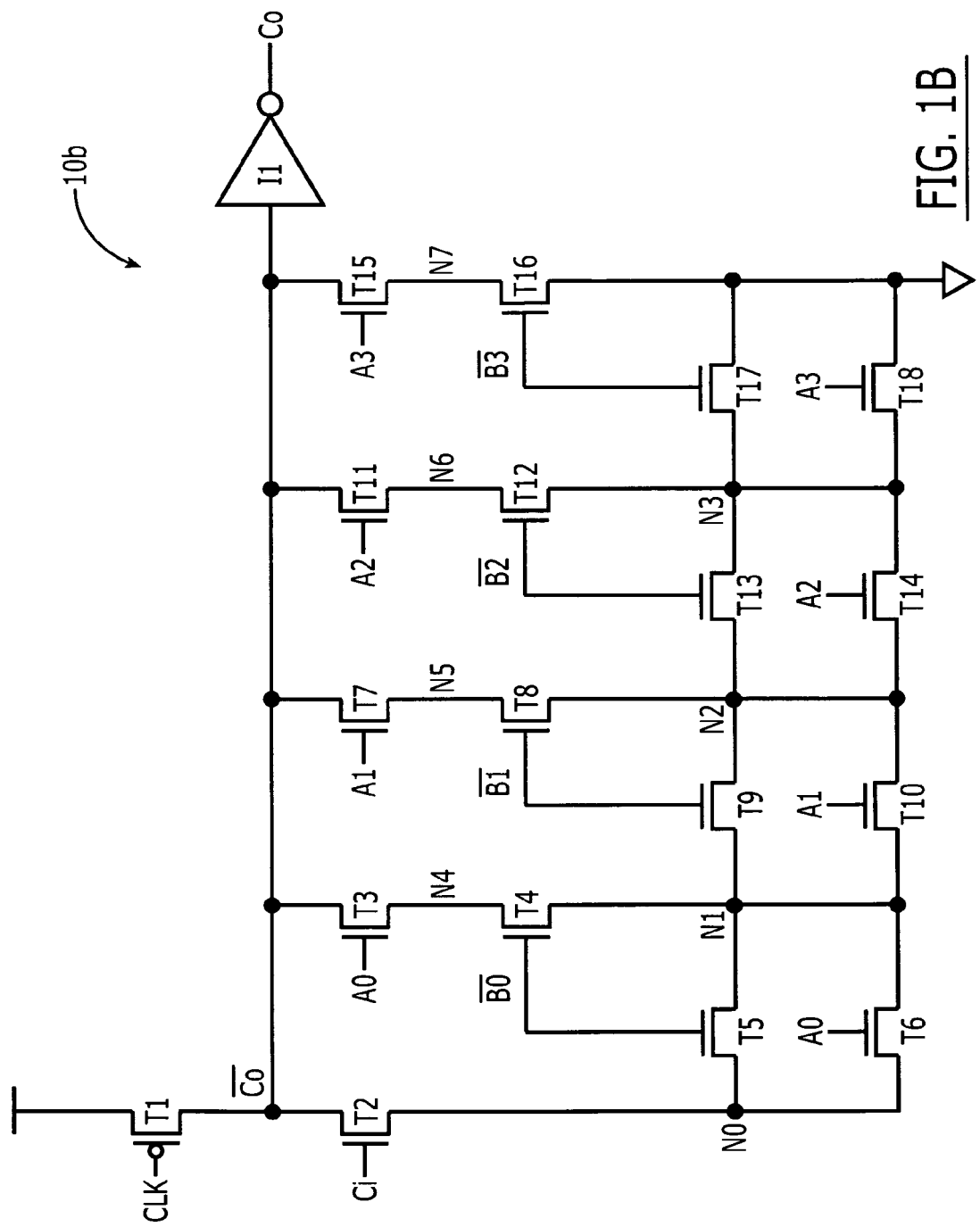
FIG. 1B is an electrical schematic of a 4-bit comparator cell according to embodiments of the present invention.
Figure 1C:
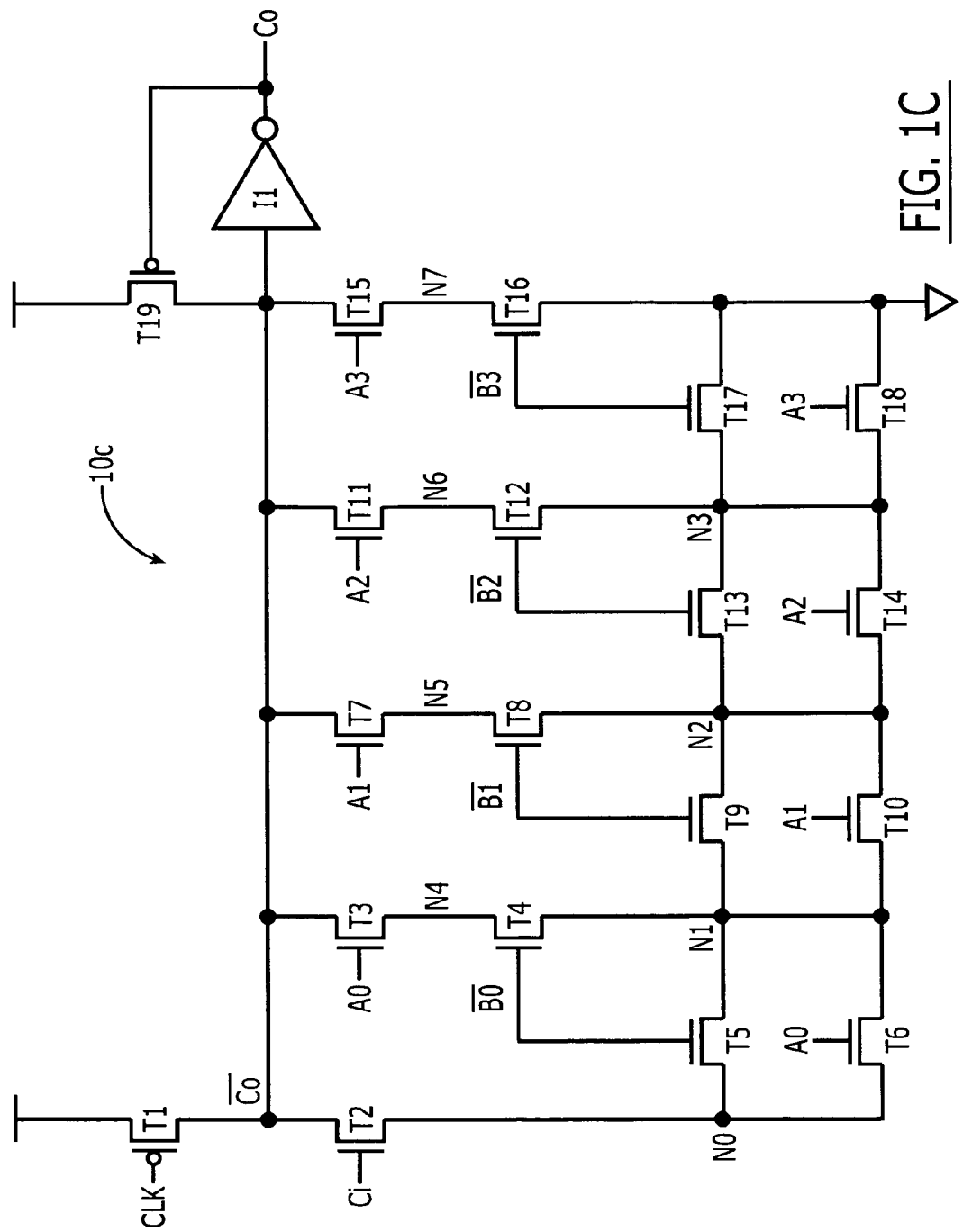
FIG. 1C is an electrical schematic of a 4-bit comparator cell according to embodiments of the present invention.

FIGS. 1B-1C illustrate alternative embodiments of the 4-bit comparator of FIG. 1A, which determines a non-strict inequality between applied operands according to the following expression (4):

$$C_o = (((C_i(A_0 + \overline{B_0}) + A_0\overline{B_0})(A_1 + \overline{B_1}) + A_1\overline{B_1})(A_2 + \overline{B_2}) + A_2\overline{B_2}) \\ (A_3 + \overline{B_3}) + A_3\overline{B_3} \quad (4)$$

As illustrated by FIG. 1B, the 4-bit comparator 10*b* is illustrated as a 20 T comparator cell with inverter I1 representing a 2 T CMOS inverter. This 4-bit comparator 10*b* is configured so that each one bit increase in "n" results in a four transistor increase in cell size for "n" in at least the following range: 2<n<6. Transistor T1 has a gate terminal that receives to a clock signal CLK and input transistor T2 has a gate terminal that receives the control input signal $C_i$. A high-to-low transition of the clock signal CLK during a precharge time interval operates to precharge a primary node (node /$C_o$) of the comparator cell to a level 1 voltage (e.g., Vdd) and thereby set the control output signal $C_o$ to a logic 0 voltage. During an evaluation time interval when a comparison operation is to be performed, the clock signal CLK is switched low-to-high and maintained at a logic 1 voltage. The four bits of operand A (i.e., A[3:0]) and the four bits of the complement of operand B (i.e., B[3:0]) are provided to transistors T3-T18, as illustrated. NMOS transistors T5 and T6 are connected in parallel between node N0 and node N1. NMOS transistors T9 and T10 are connected in parallel between node N1 and node N2. NMOS transistors T13 and T14 are connected in parallel between node N2 and node N3. NMOS transistors T17 and T18 are connected in parallel between node N3 and a ground signal line Vss. NMOS transistors T3 and T4 are connected in series between node N1 and the primary node (node /$C_o$). NMOS transistors T7 and T8 are connected in series between node N2 and the primary node. NMOS transistors T11 and T12 are connected in series between node N3 and the primary node. NMOS transistors T15 and T16 are connected in series between the ground signal line Vss and the primary node. In the event the inverter I1 is omitted from the comparator 10*b* and the primary node /$C_o$ is provided directly as an output signal, then the comparator 10*b* is configured as 4n+2 transistors. Nonetheless, the inverter I1 is useful because it regenerates the control output signal between stages in a multi-stage comparator.

Figure 1D:
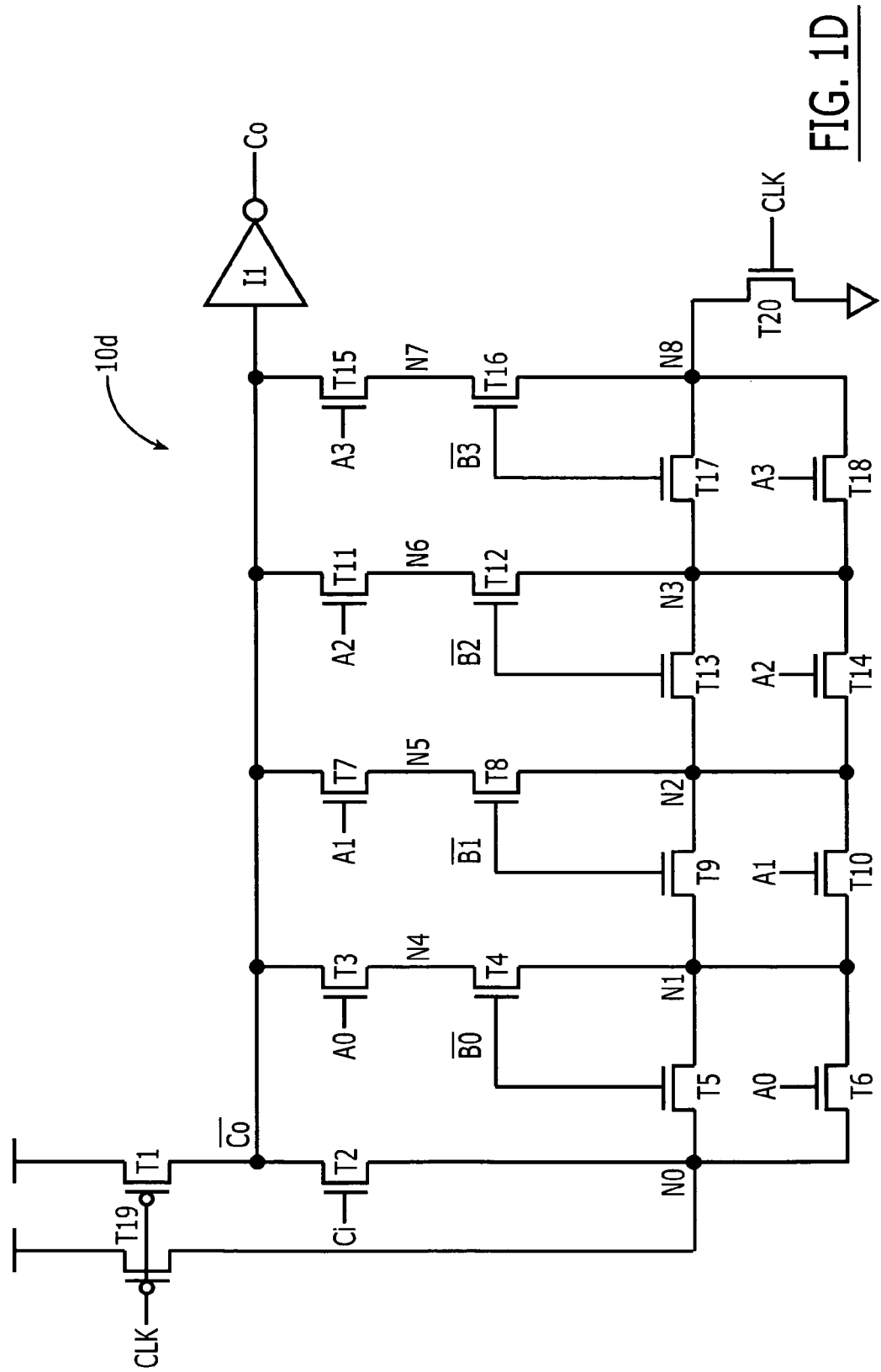
FIG. 1D is an electrical schematic of a 4-bit comparator cell according to embodiments of the present invention.

The 4-bit comparators 10*c* and 10*d* of FIGS. 1C and 1D, respectively, represent alternatives to the 4-bit comparator 10*b* of FIG. 1B, which take into account and compensate for non-ideal transistor characteristics. The comparator 10*c* of FIG. 1C includes 4n+5 transistors and the comparator 10*d* of FIG. 1D includes 4n+6 transistors. In particular, to prevent leakage currents from possibly pulling the primary node (node /$C_o$) low during an evaluation time interval, a relatively weak pull-up transistor T19 is provided in the comparator 10*c* to support a logic 1 precharge voltage on the primary node. This logic 1 precharge voltage is only maintained in the absence of a "stronger" pull-down current path provided between the primary node and a ground signal line (shown as Vss), which is electrically connected to source terminals of NMOS transistors T16, T17 and T18. Moreover, as illustrated by FIG. 1D, many of the internal nodes of the comparator cell 10*d* can be precharged high to a logic 1 voltage by turning off NMOS pull-down transistor T20 and turning on PMOS pull-up transistor T19 during the precharge time interval (when CLK=0). The internal nodes N1-N8 can also be precharged by temporarily setting one or both of the operands to all logic 1 values during the precharge time interval (i.e., A=1111 and /B=1111 during the precharge time interval).

Figure 2A:
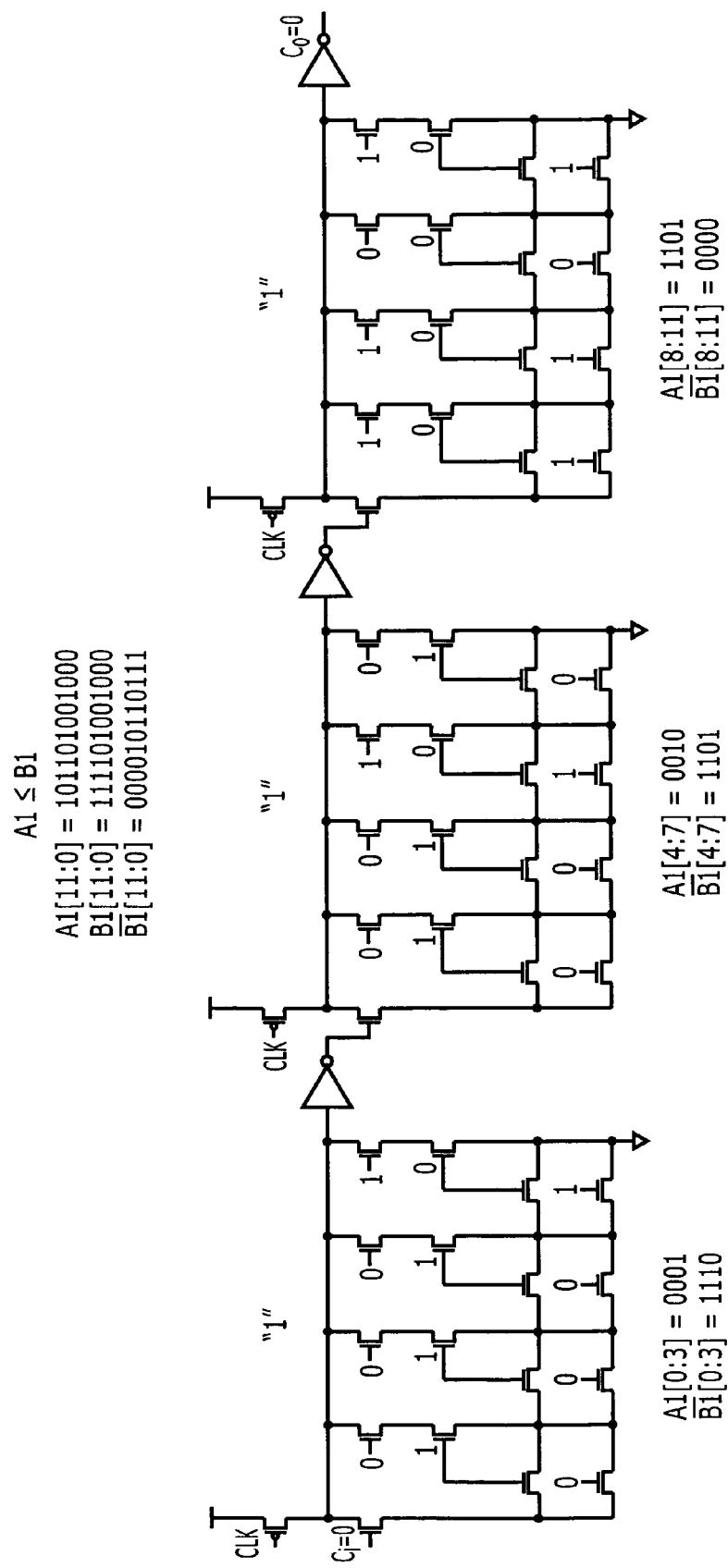
FIG. 2A is an electrical schematic showing 3-stages of a 4-bit comparator cell according to embodiments of the present invention.
Figure 2B:
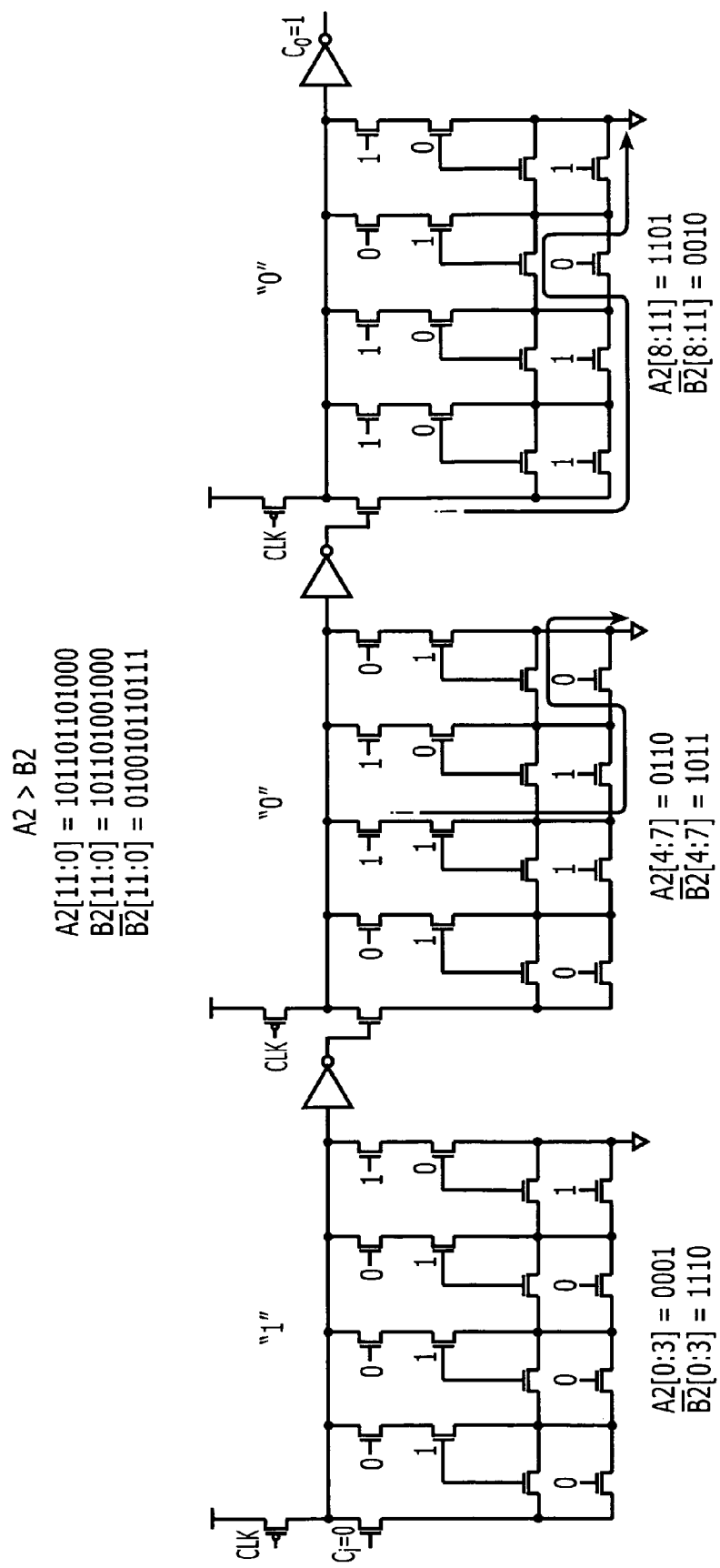
FIG. 2B is an electrical schematic showing 3-stages of a 4-bit comparator cell according to embodiments of the present invention.

The above-described 4-bit comparators of FIGS. 1B-1D may be connected as a plurality of stages to thereby define a larger comparator of desired length. For example, FIG. 2A illustrates a 12-bit comparator containing three (3) stages of the 4-bit comparator 10*b* of FIG. 1B. Moreover, FIG. 2A contains annotations illustrating how a determination is made that one 12-bit operand A1[11:0]=101101001000 is less than or equal to another 12-bit operand B1[11:0]=111101001000, for the case where the control input signal $C_i$ is set to a logic 0 voltage. For this example, each primary node (/$C_o$) within each stage remains at a logic 1 voltage and the final control output signal $C_o$ is set to a logic 0 voltage to reflect the fact that A1≦B1. FIG. 2B, which illustrates a 12-bit comparator containing three (3) stages of the 4-bit comparator 10*b* of FIG. 1B., contains annotations illustrating how a determination is made that one 12-bit operand A2[11:0]=101101101000 is greater than another 12-bit operand B2[11:0]= 101101001000, for the case where the control input signal $C_i$ is set to a logic 0 voltage. Similarly, the 12-bit comparator of FIG. 2C contains annotations illustrating how a determination is made that operand A3[11:0]=111101001000 is greater than operand B3[11:0]=101101001000, for the case where the control input signal $C_i$ is set to a logic 0 voltage.

The integrated circuit comparator 10*a* of FIG. 1A may be configured to support boolean equivalent operations to those illustrated by expression (1). In particular, equation (1) may be rewritten as:

$$C_o = ((...((C_i + A_0\overline{B_0})(A_0 + \overline{B_0}) + A_1\overline{B_1})(A_1 + \overline{B_1})... + A_{n-2}\overline{B_{n-2}}) \quad (5)$$
$$(A_{n-2} + \overline{B_{n-2}}) + A_{n-1}\overline{B_{n-1}})(A_{n-1} + \overline{B_{n-1}}).$$

This equivalency between expression (1) and expression (5) can be demonstrated most readily by rewriting expression (5) for the case where n=1:

$$\begin{aligned}C_o &= (C_i + A_0\overline{B_0})(A_0 + \overline{B_0}) \\ &= C_iA_0 + C_i\overline{B_0} + A_0\overline{B_0}A_0 + A_0\overline{B_0}\overline{B_0} \\ &= C_iA_0 + C_i\overline{B_0} + A_0\overline{B_0} + A_0\overline{B_0} \\ &= C_iA_0 + C_i\overline{B_0} + A_0\overline{B_0} \\ &= C_i(A_0 + \overline{B_0}) + A_0\overline{B_0}\end{aligned}$$

Figure 1E:
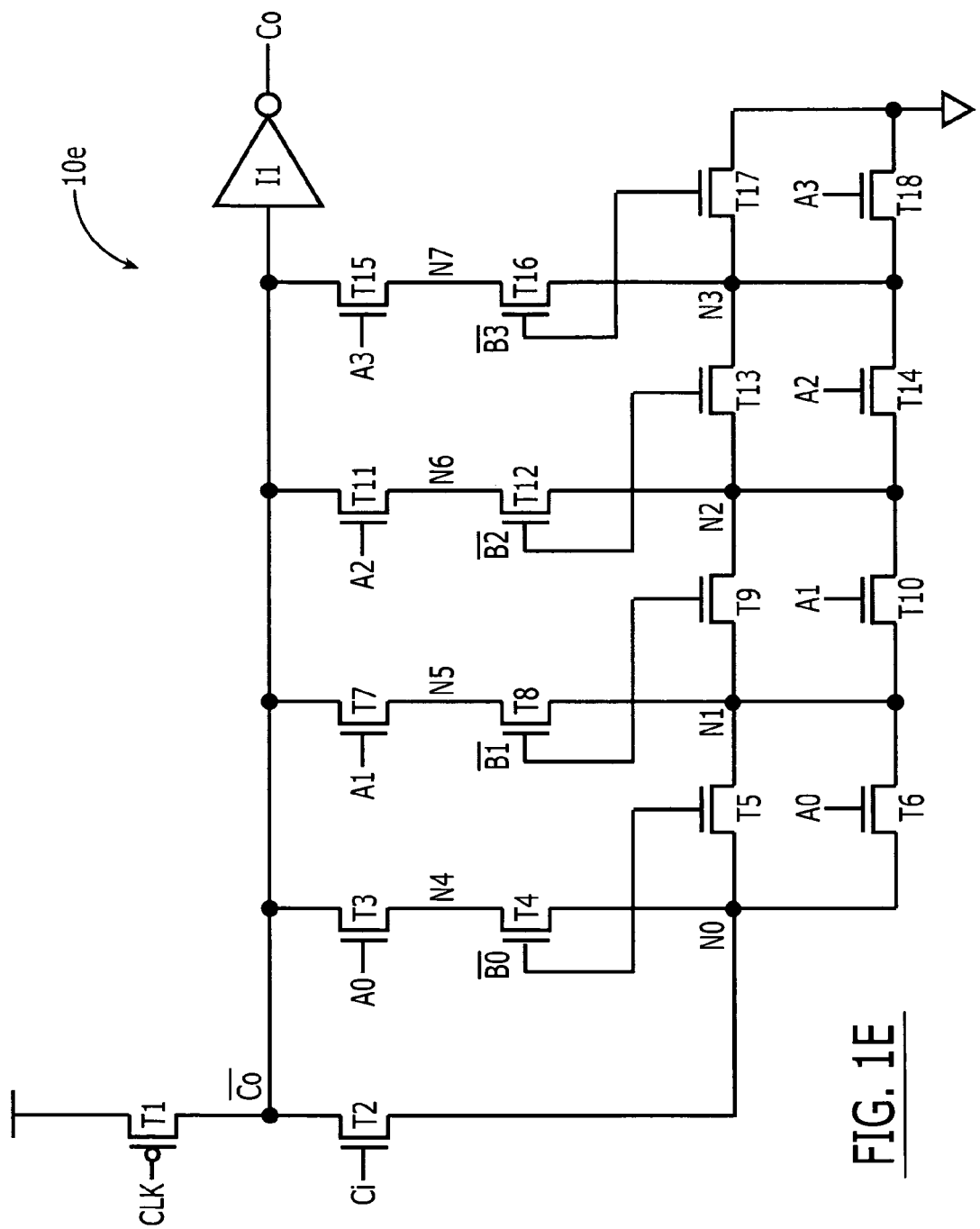
FIG. 1E is an electrical schematic of a 4-bit comparator cell according to embodiments of the present invention.

FIG. 1E illustrates a 4-bit comparator 10e that is configured to perform a non-strict inequality in accordance with expression (5) for the case where n equals 4. The comparator 10e of FIG. 1E is similar to the comparator 10b of FIG. 1B, however, locations of nodes N0, N1, N2 and N3 have been shifted relative to the source terminals of NMOS transistors T4, T8, T12 and T16.

Expression (1) may also be rewritten using exclusive-OR operators as:

$$C_o = (...((C_i(A_0 \oplus \overline{B_0}) + A_0\overline{B_0})(A_1 \oplus \overline{B_1}) + A_1\overline{B_1})...(A_{n-2} \oplus \overline{B_{n-2}}) + \quad (6)$$
$$A_{n-2}\overline{B_{n-2}})(A_{n-1} \oplus \overline{B_{n-1}}) + A_{n-1}\overline{B_{n-1}}.$$

Expression (6) may be further modified into an alternative equivalent boolean expression by replacing each remaining "+" operation with an exclusive-OR operation ($\oplus$).

Figure 3:
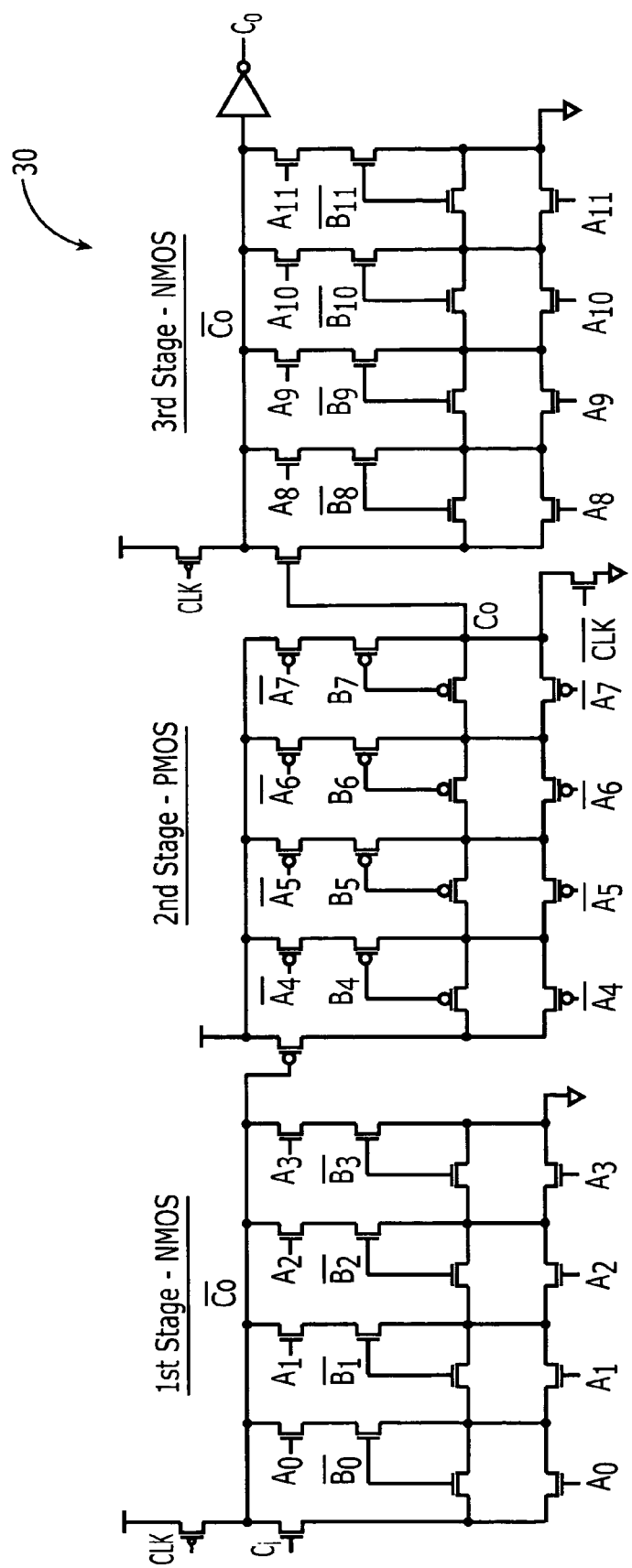
FIG. 3 is an electrical schematic showing as 12-bit comparator having alternating 4-bit NMOS and PMOS transistor stages therein.

Referring now to FIG. 3, a 12-bit comparator 30 is illustrated as including an alternating arrangement of 4-bit stages containing NMOS transistors (as illustrated by FIG. 1B) or PMOS transistors. The 18-transistor stages illustrated by FIG. 3 are directly connected end-to-end without any interstage inverters for accelerating and re-strengthening signal propagation. Nonetheless, an inverting buffer (shown in FIG. 3) may be used to generate a final output control signal $C_o$ in the event the last n-bit stage of the comparator 30 is an NMOS stage. Alternatively, a non-inverting buffer (not shown) may be used to generate a final output control signal $C_o$ in the event the last n-bit stage of the comparator is a PMOS stage.

Applying the numeric example of FIG. 2A to the comparator 30 of FIG. 3 yields a control output signal $C_o$ (from the third 4-bit NMOS stage) equal to 0, which correctly identifies A1[11:0]≦B1[11:0]. In this example, A1[0:3]=0001, /A1[4:7]=1101, A1[8:11]=1101, /B1[0:3]=1110, B1[4:7]=0010, /B1[8:11]=0000. As will be understood by those skilled in the art, a pre-encoder (not shown) of conventional design may be used to generate the complementary data values /A1[4:7], /B1[0:3] and /B1[8:11]. Based on these data values, the signal /$C_o$ for the first stage equals 1, the intermediate control output signal $C_o$ for the second stage equals 0 and the control output signal $C_o$ for the third stage equals 0. Applying the numeric example of FIG. 2B to the comparator 30 of FIG. 3 yields a control output signal $C_o$ (from the third 4-bit NMOS stage) equal to 1, which correctly identifies A2[11:0]>B2[11:0]. In this example, A2[0:3]=0001, /A2[4:7]=1001, A2[8:11]=1101, /B2[0:3]=1110, B2[4:7]=0010, /B2[8:11]=0010. Based on these data values, the signal /$C_o$ for the first stage equals 1, the intermediate control output signal $C_o$ for the second stage equals 1 and the control output signal $C_o$ for the third stage equals 1. Applying the numeric example of FIG. 2C to the comparator 30 of FIG. 3 yields a control output signal $C_o$ (from the third 4-bit NMOS stage) equal to 1, which correctly identifies A3[11:0]>B3[11:0]. In this example, A3[0:3]=0001, /A3[4:7]=1101, A3[8:11]=1111, /B3[0:3]=1110, B3[4:7]=0010, /B3[8:11]=0010. Based on these data values, the signal /$C_o$ for the first stage equals 1, the intermediate control output signal $C_o$ for the second stage equals 0 and the control output signal $C_o$ for the third stage equals 1.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit comparator, comprising:
    at least one n-bit comparator cell configured to determine a non-strict inequality between a first n-bit operand A[n−1, ..., 0] and a second n-bit operand B[n−1, ..., 0], according to the following expression and boolean equivalents of the following expression:

$$C_o = (...((C_i(A_0 + \overline{B_0}) + A_0\overline{B_0})(A_1 + \overline{B_1}) + A_1\overline{B_1})...(A_{n-2} + \overline{B_{n-2}}) +$$
$$A_{n-2}\overline{B_{n-2}})(A_{n-1} + \overline{B_{n-1}}) + A_{n-1}\overline{B_{n-1}},$$

where n is a positive integer greater than one, $C_i$ is a control input signal and $C_o$ or its complement is a control output signal, said at least one n-bit comparator cell comprising:
    a first pair of MOS transistors electrically connected in parallel between first and second nodes and having gate terminals that receive operand bit A0 and a complement of operand bit B0, respectively;
    a second pair of MOS transistors electrically connected in parallel between the second node and a third node and having gate terminals that receive operand bit A1 and a complement of operand bit B1, respectively;
    a third pair of MOS transistors electrically connected in series between the second node and a fourth node and having gate terminals that receive the operand bit A0 and the complement of operand bit B0, respectively;
    a fourth pair of MOS transistors electrically connected in series between the third node and the fourth node and having gate terminals that receive the operand bit A1 and the complement of operand bit B1, respectively; and
    a MOS input transistor having a first current carrying terminal electrically connected to the first node, a second current carrying terminal electrically connected to the fourth node and a gate terminal that receives the control input signal $C_i$.

2. The comparator of claim 1, wherein said at least one n-bit comparator cell is configured so that each one bit increase in "n" results in a four transistor increase in cell size for "n" in at least the following range: 2<n<6.

3. The comparator of claim 1, wherein said at least one n-bit comparator cell is an M-transistor cell, where M is a positive integer in a range from 4n+2 to 4n+6.

4. The comparator of claim 3, wherein said at least one n-bit comparator cell is configured so that each one bit increase in "n" results in a four transistor increase in cell size for "n" in at least the following range: 2<n<6.

5. An integrated circuit comparator, comprising:
at least one n-bit comparator cell configured to determine a non-strict inequality between a first n-bit operand A[n−1, . . . , 0] and a second n-bit operand B[n−1, . . . , 0], according to the following expression and boolean equivalents of the following expression:

$$C_o = (\ldots((C_i(A_0 + \overline{B_0}) + A_0\overline{B_0})(A_1 + \overline{B_1}) + A_1\overline{B_1})\ldots(A_{n-2} + \overline{B_{n-2}}) + A_{n-2}\overline{B_{n-2}})(A_{n-1} + \overline{B_{n-1}}) + A_{n-1}\overline{B_{n-1}},$$

where n is a positive integer greater than one, $C_i$ is a control input signal and $C_o$ or its complement is a control output signal, said at least one n-bit comparator cell comprising:
a first pair of MOS transistors electrically connected in parallel between first and second nodes and having gate terminals that receive operand bit A0 and a complement of operand bit B0, respectively;
a second pair of MOS transistors electrically connected in parallel between the second node and a third node and having gate terminals that receive operand bit A1 and a complement of operand bit B1, respectively;
a third pair of MOS transistors electrically connected in series between the first node and a fourth node and having gate terminals that receive the operand bit A0 and the complement of operand bit B0, respectively;
a fourth pair of MOS transistors electrically connected in series between the second node and the fourth node and having gate terminals that receive the operand bit A1 and the complement of operand bit B1, respectively; and
a MOS input transistor having a first current carrying terminal electrically connected to the first node, a second current carrying terminal electrically connected to the fourth node and a gate terminal that receives the control input signal $C_i$.

6. An integrated circuit comparator, comprising:
a comparator cell responsive to a control input signal and first and second multi-bit operands, said comparator cell configured to generate a control output signal that encodes a "≦" inequality between the first and second multi-bit operands when the control input signal is in a first logic state and encodes a "≧" inequality between the first and second multi-bit operands when the control input signal is in a second logic state;
wherein the first and second multi-bit operands equal A[n−1, . . . , 0] and B[n−1, . . . , 0], respectively; and
wherein said comparator cell comprises:
a first pair of MOS transistors electrically connected in parallel between first and second nodes and having gate terminals that receive operand bit A0 and a complement of operand bit B0, respectively;
a second pair of MOS transistors electrically connected in parallel between the second node and a third node and having gate terminals that receive operand bit A1 and a complement of operand bit B1, respectively;
a third pair of MOS transistors electrically connected in series between the second node and a fourth node and having gate terminals that receive the operand bit A0 and the complement of operand bit B0, respectively;
a fourth pair of MOS transistors electrically connected in series between the third node and the fourth node and having gate terminals that receive the operand bit A1 and the complement of operand bit B1, respectively; and
a MOS input transistor having a first current carrying terminal electrically connected to the first node, a second current carrying terminal electrically connected to the fourth node and a gate terminal that receives the control input signal.

7. The comparator of claim 6, wherein said comparator cell is an n-bit comparator cell that is configured so that each one bit increase in "n" results in a four transistor increase in cell size for "n" in at least the following range: 2<n<6.

8. The comparator of claim 6, wherein said comparator cell is an n-bit comparator cell having M transistors therein, where M is a positive integer in a range from 4n+2 to 4n+6, for "n" in at least the following range: 2<n<6.

9. The comparator of claim 8, wherein the n-bit comparator cell is configured so that each one bit increase in "n" results in a four transistor increase in cell size for "n" in at least the following range: 2<n<6.

10. An integrated circuit comparator, comprising:
a comparator cell responsive to a control input signal and first and second multi-bit operands, said comparator cell configured to generate a control output signal that encodes a "≦" inequality between the first and second multi-bit operands when the control input signal is in a first logic state and encodes a "≧" inequality between the first and second multi-bit operands when the control input signal is in a second logic state;
wherein the first and second multi-bit operands equal A[n−1, . . . , 0] and B[n−1, . . . , 0], respectively; and
wherein said comparator cell comprises:
a first pair of MOS transistors electrically connected in parallel between first and second nodes and having gate terminals that receive operand bit A0 and a complement of operand bit B0, respectively;
a second pair of MOS transistors electrically connected in parallel between the second node and a third node and having gate terminals that receive operand bit A1 and a complement of operand bit B1, respectively;
a third pair of MOS transistors electrically connected in series between the first node and a fourth node and having gate terminals that receive the operand bit A0 and the complement of operand bit B0, respectively;
a fourth pair of MOS transistors electrically connected in series between the second node and the fourth node and having gate terminals that receive the operand bit A1 and the complement of operand bit B1, respectively; and
a MOS input transistor having a first current carrying terminal electrically connected to the first node, a second current carrying terminal electrically connected to the fourth node and a gate terminal that receives the control input signal.

* * * * *